United States Patent

Duncan et al.

(10) Patent No.: US 6,383,455 B1
(45) Date of Patent: May 7, 2002

(54) CERAMIC SLOT REACTOR FOR ETHYLENE PRODUCTION

(75) Inventors: Dennis A. Duncan, Texas City; Joseph M. Gondolfe, Cypress, both of TX (US)

(73) Assignee: Stone & Webster Engineering Corp.

(*) Notice: Subject to any disclaimer, the term of this patent is extended or adjusted under 35 U.S.C. 154(b) by 0 days.

(21) Appl. No.: 08/934,117

(22) Filed: Sep. 19, 1997

(51) Int. Cl.[7] .............................. F28D 7/00; F28D 21/00
(52) U.S. Cl. ............................................. 422/201; 422/198
(58) Field of Search ................................ 422/201, 240, 422/241; 585/403, 636, 920, 537

(56) References Cited

U.S. PATENT DOCUMENTS

| | | | |
|---|---|---|---|
| 2,051,363 A | 8/1936 | Beekley | 423/650 |
| 2,671,198 A | 3/1954 | Beverly | 324/653 |
| 2,733,287 A * | 1/1956 | Schauble et al. | 585/537 |
| 4,342,642 A | 8/1982 | Bauer et al. | 208/130 |
| 4,440,727 A | 4/1984 | Bruck | 422/197 |
| 4,765,883 A * | 8/1988 | Johnson et al. | 208/78 |
| 4,780,196 A | 10/1988 | Alagy et al. | 208/130 |
| 4,973,777 A * | 11/1990 | Alagy et al. | 585/403 |

* cited by examiner

*Primary Examiner*—Jerry D. Johnson
*Assistant Examiner*—Alexa A. Doroshenk
(74) *Attorney, Agent, or Firm*—Akin Gump Strauss Hauer & Feld LLP

(57) ABSTRACT

A cracking furnace within the firebox of which is located a ceramic structure presenting opposing wall surfaces which thereby define a slot-like passageway through which hydrocarbons may be fed through the firebox of the furnace. This ceramic structure is capable of service under much greater heat loads and temperatures than are metallic reaction lines as have heretofore been used, allowing for a greater firebox temperature which in turn produces an even more rapid cracking of saturated hydrocarbon into ethylene at millisecond residence times within the firebox limits.

2 Claims, 5 Drawing Sheets

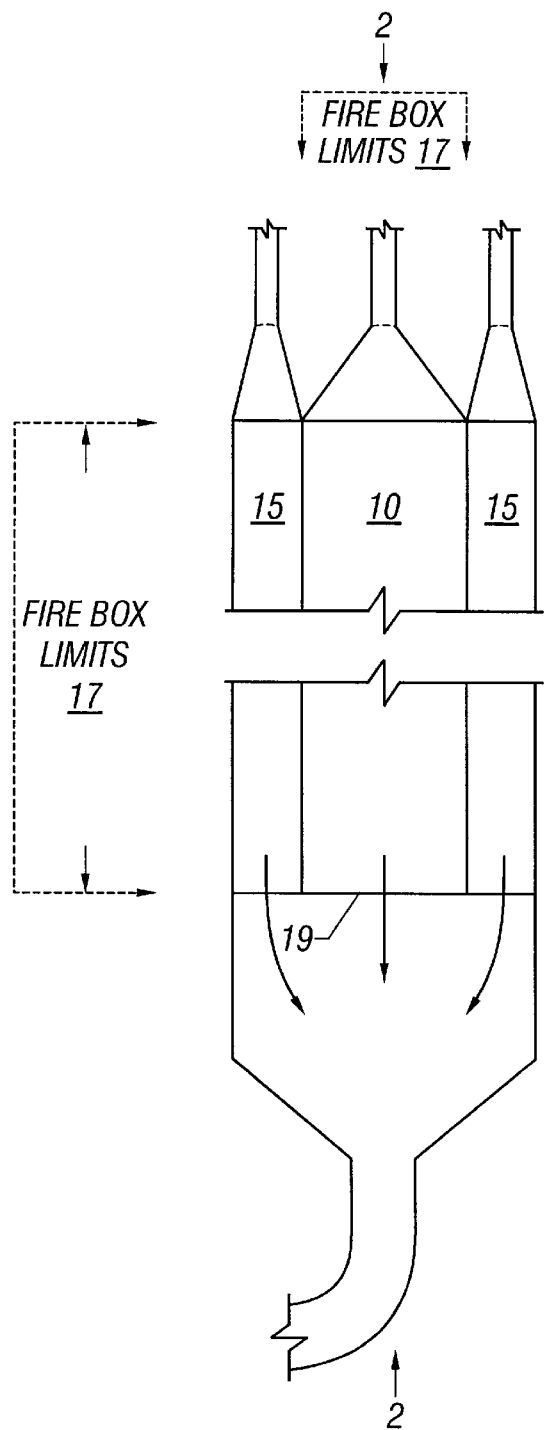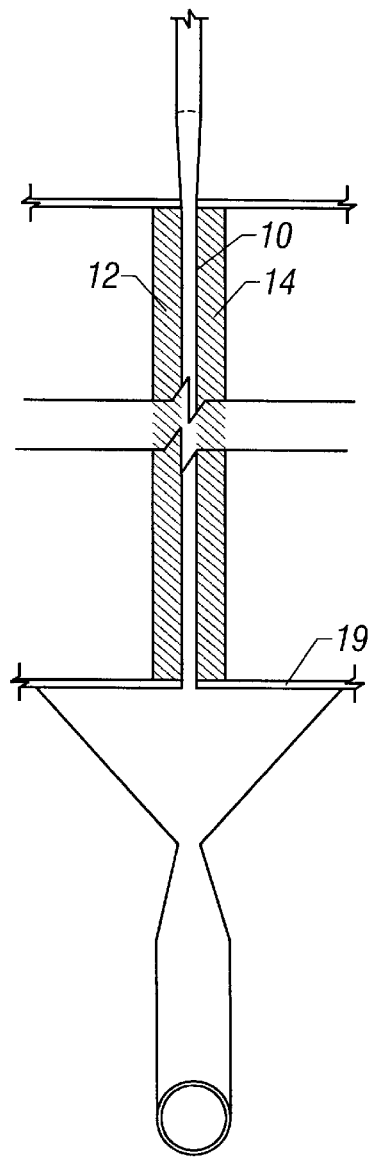
FIG. 1
FIG. 2

CERAMIC SLOT REACTOR FOR ETHYLENE PRODUCTION

STATEMENT REGARDING FEDERALLY SPONSORED RESEARCH

This invention was in part produced through funding under a U.S. Government sponsored program (Contract No. DE-FC02-88ID12797) and the United States Government has certain rights therein.

CROSS-REFERENCE TO RELATED APPLICATIONS

Not Applicable.

BACKGROUND OF THE INVENTION

Steam cracking furnaces have long been used to crack a variety of hydrocarbon feedstocks to ethylene and other valuable olefinic gases. For the past 20 or 30 years cracking at short residence time and high temperature has been favored for its beneficial effect on selectivity to ethylene. Basic designs of such short residence time-high temperature steam cracking furnaces are illustrated by U.S. Pat. No. 2,671,198 (dated Jun. 20, 1972) and U.S. Pat. No. 4,342,642 (dated Aug. 3, 1982).

When thermally cracking a saturated hydrocarbon down to olefinic hydrocarbons—such as the cracking of ethane to predominantly ethylene or the cracking of heavier saturated hydrocarbons like those comprising a naphtha or gas oil feedstock down to ethylene and other higher olefins—in order to maximize the conversion and the selectivity of such cracking conversion of the saturated hydrocarbon feedstock into ethylene, it is desirable to input that quantity of heat (Q) needed to effect cracking of the saturated hydrocarbon feed very rapidly while minimizing the time that the initial cracking product—namely, ethylene—is exposed to this quantity of cracking heat. To fast crack the saturated hydrocarbon feed to ethylene and then quickly remove this so formed ethylene from this high heat environment maximizes the final yield of ethylene for the degree of conversion obtained. This then is the concept that underlies the millisecond residence time at a high temperature which is now the preferred mode for furnace cracking of saturated hydrocarbon feeds to olefin products.

A steam cracking furnace comprises a refractory lined firebox containing a multiplicity of high alloy metal cracking lines through the interior passage of which flows the hydrocarbon feedstock to be cracked, together with a suitable amount of diluting steam. The sensible heat and the heat of cracking are supplied by burners located on the floor and/or walls of the firebox and this heat transfers through the metallic materials of these reaction lines into hydrocarbon feedstock that flows therewithin. A metallic cracking line can be as long as 400 feet and coiled in a serpentine shape that runs vertically up and down in the firebox, or it may be as short as 40 feet in a straight single pass through the firebox, such as the design described in the U.S. Pat. No. 4,342,642 cited above.

Cracking furnaces, as constructed today, provide for millisecond residence time at high temperatures and are, with respect to their radiant heating cracking reaction lines, constructed of metallic materials. The fireboxes themselves, since these are lined with refractory materials, are capable of delivering a greater heat load than the metallic materials of the radiant cracking reaction lines located within the firebox can withstand. This maximum service temperature of the metallic materials of which the cracking reaction lines are constructed then dictates a long line in order to accomplish the desired quantity of heat (Q) input into the hydrocarbon mass flow therethrough for that short (milliseconds) time of residence of this hydrocarbon mass within the metallic cracking reaction line. Either this, or the time of residence of the hydrocarbon mass, including its ethylene content, within the metallic reaction cracking line must be increased.

Given the extreme conditions to which the materials of the cracking reaction lines are exposed in a thermal cracking operation—which involve thermal expansions and contractions of such materials as they are suspended within the firebox which radiantly heats them—to date, metallic materials have been regarded as the only materials practical for construction of such cracking lines. The strength and serviceability dictated by the dimensions required by a cracking line in order to achieve the needed transfer of heat to accomplish the level and degree of cracking desired with the short residence times that are desired have, here to date, dictated the use of metallic materials for their construction.

SUMMARY OF THE INVENTION

It is the object of the present invention to utilize refractory materials for construction of the cracking lines, such as silicon carbide or other ceramics, including composite materials, that can operate at much higher temperatures than present high alloy steels, and in so doing, to drastically reduce the cracking line length to as low as 20 feet of fired length. This not only reduces the firebox size but also gives greater selectivity toward olefinic products, including ethylene, because of the very short residence time that reduces secondary, olefin degradation reactions.

It is a further object of this invention to utilize ceramic materials in a way that avoids the need to fabricate very long thin tubes like those of the alloy cracking line tubes used in the present day state of the art furnaces. Such alloy tubes are typically forty feet in length and one inch in diameter. Tubes of such dimensions would be exceedingly fragile if made of ceramic materials. In the reactor of this invention a very much more robust construction is made using a construction of thick (about one inch) refractory plates or slabs that define and/or house a slot-shaped reaction line or pathway, the plates/slabs being about 20 to 30 feet in length and 3 to 6 feet wide. The slot width or thickness defined by the plate/slab construction is typically less than one inch and it is formed by assembling and joining large slabs of ceramic material through ceramic spacers or by the use of removable wooden forms in an integral casting of a whole ceramic structure.

BRIEF DESCRIPTION OF THE DRAWINGS

FIG. 1 illustrates in a side section view a ceramic slot reaction line, the ceramic slabs which define the slot reaction line and their locations within the firebox limits of the furnace housing and the side joint portions of the ceramic slabs as located within shadow boxes appurtenant to the furnace housing but outside of the firebox limits of the furnace housing.

FIG. 2 illustrates in a front sectional view taken alone line 2—2 of FIG. 1 of the ceramic slot reaction line.

DETAILED DESCRIPTION OF INVENTION

The above objects and others are achieved by means of a Slot Reactor structure made up of two relatively thick castings of ceramic material, such as silicon carbide, joined together through spacers to form a slot between them, which runs their whole length to form a high temperature cracking line as best depicted in FIGS. 1–4 hereof. Alternatively, the reactor cracking line structure may be made a monolithic casting, using wooden forms to define the slot reaction line geometry within the ceramic casting.

Figure 3:
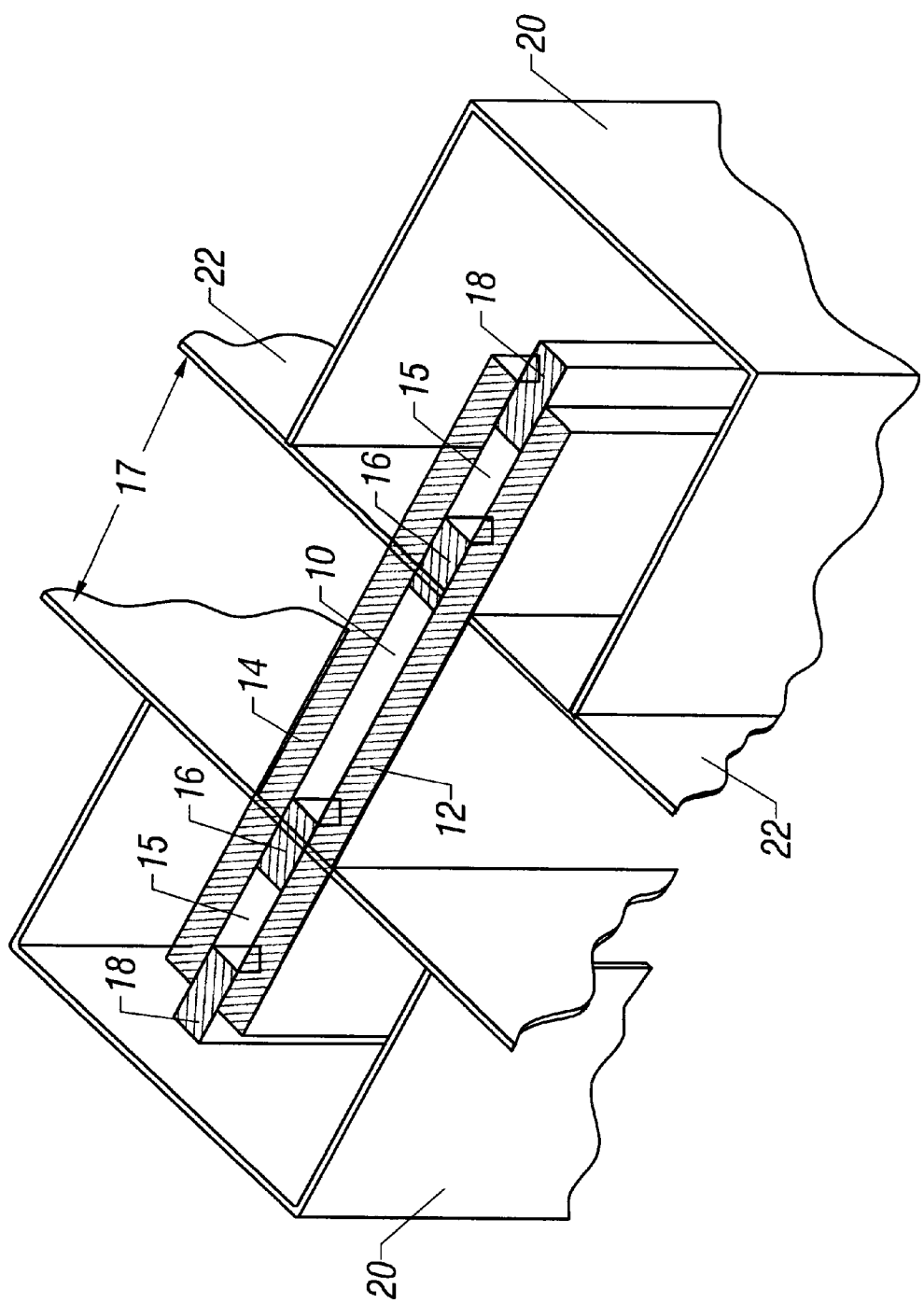
FIG. 3 is a partial perspective view of the ceramic slabs and ceramic spacers there between by which construction the ceramic slot reaction line is defined and the relationship of this slab-spacer construction to the furnace housing walls that define the firebox limits of the furnace and the shadow boxes appurtenant thereto.
Figure 4:
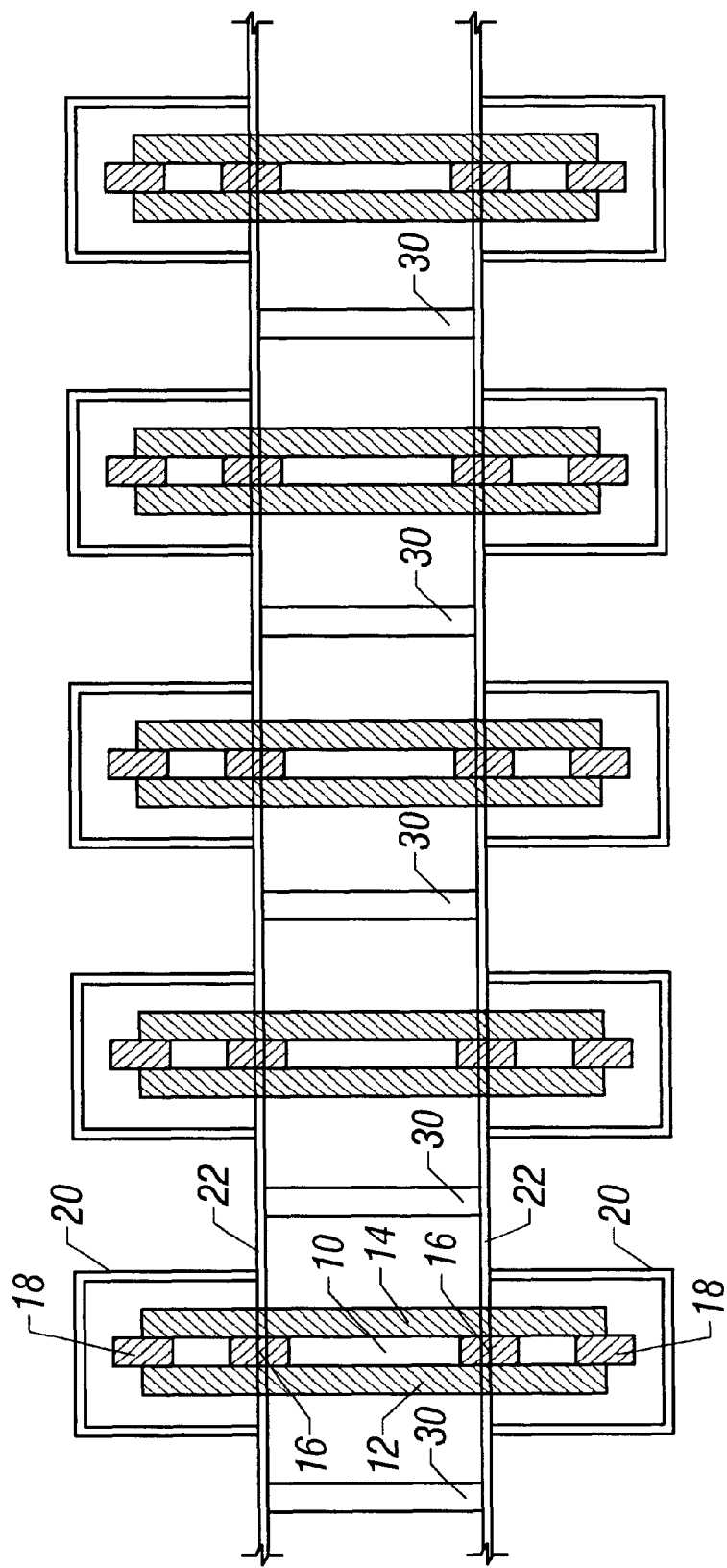
FIG. 4 is a top sectional view which schematically illustrates the furnace housing walls which define the firebox limits, the shadow box walls appurtenant thereto, and the positional relationship of a multiplicity of ceramic slab-spacer constructions defining a multiplicity of ceramic slot reaction lines with respect to the firebox and shadow box limits of the furnace.

In the "assembled" type of construction as shown in FIGS. 1–4 the joints uniting the two ceramic slabs that form the reaction line are made on their long edges, outside the firebox proper, in a shadow box. This is best depicted in FIGS. 3–4. In the alternative method of construction, using wooden forms to male the reactor structure within a monolithic casting, there would be no joints, and a shadow box would not be necessary.

Figure 5:
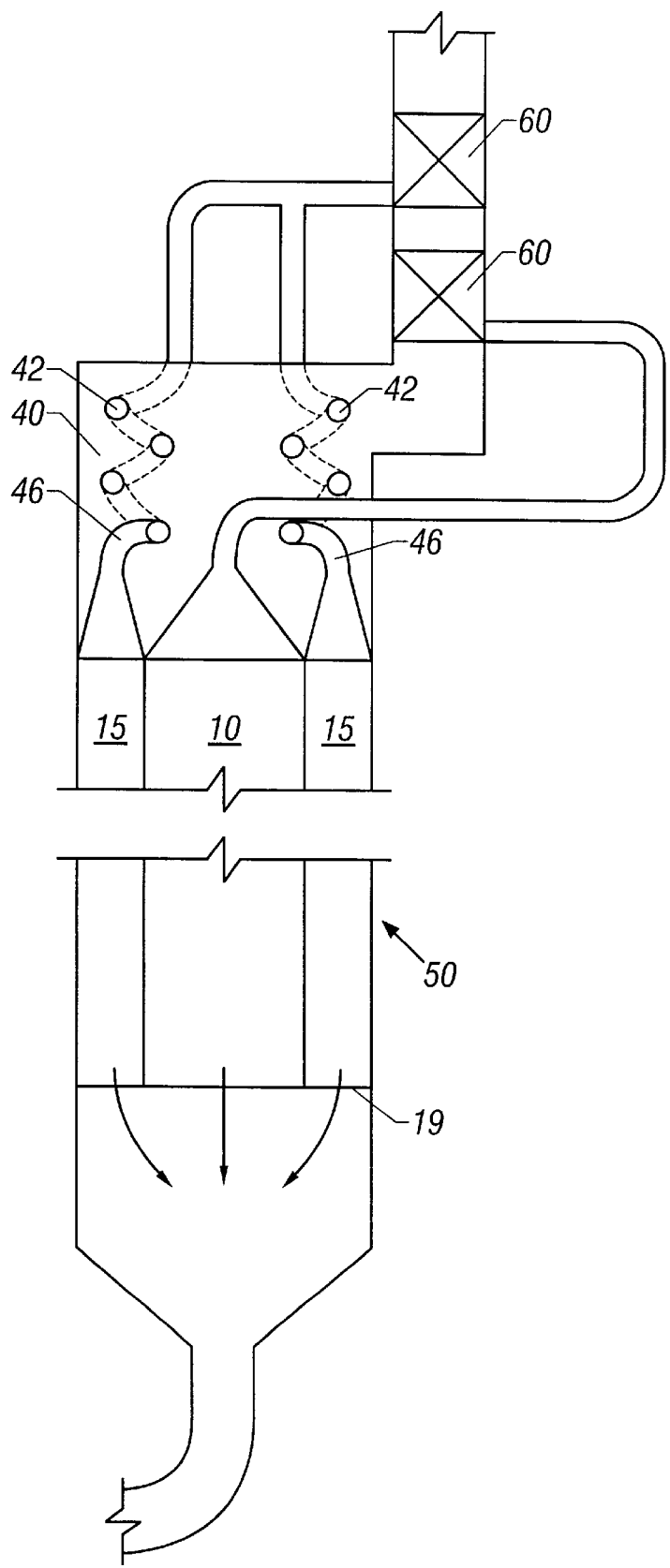
FIG. 5 is a side section view of a furnace housing which defines a convection section, a precracking section, a firebox section within the limits of which a ceramic slot reaction line is positioned like that illustrated in FIGS. 1–4, a quench/cracker or Duocracker section, and transition pieces by which the total of finally cracked product gases are communicated out of the furnace housing limits to outlet lines for routing to a further quenching operation.
Figure 6:
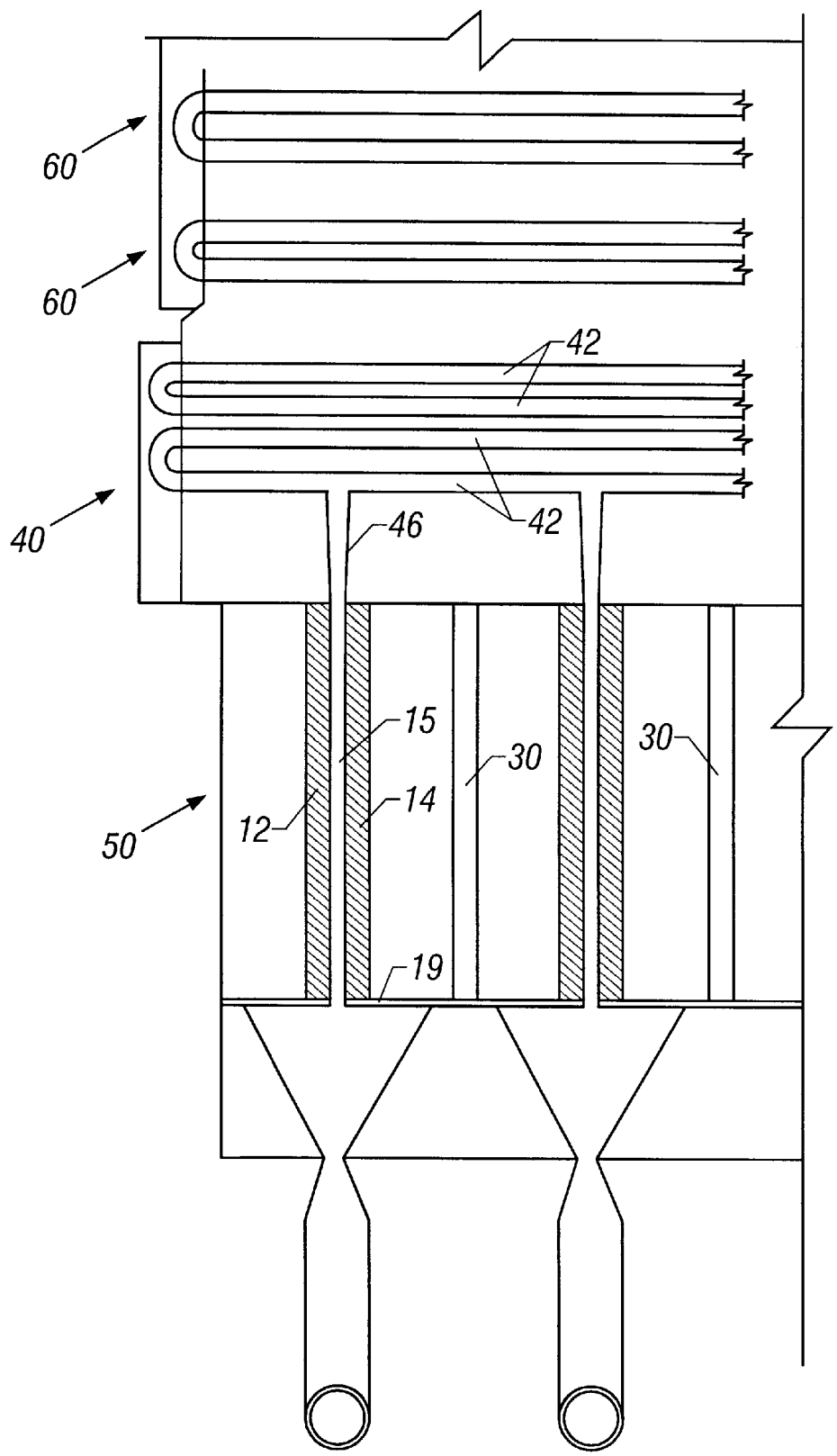
FIG. 6 is a front section view of the structures illustrated in FIG. 6 and further schematically illustrates the heat exchanger coils within the convection zone whereby hydrocarbon feed stock is preheated and dilution steam is superheated and also the cracking coils located within the precracker section wherein a portion of the hydrocarbon feed stock as diluted with superheated steam is partially precracked.

With reference to FIG. 3, each ceramic slot reaction line 10 is defined by a structure which comprises two ceramic refractory slabs 12 and 14, respectively, which are spaced apart one from another by a distance "d" determined by ceramic spacers 16 and 18. That slot 10 defined by the ceramic slabs which exist between the center spacers 16 is positioned with the firebox limits 17 of a furnace housing, as best illustrated by FIGS. 4–6 and also FIGS. 1–2. Each edge end of the ceramic slabs, with their respective end spacers 18, are located within a shadow box structure 20 appurtenant to the furnace housing wall 22 and define a slot 15 there between which is located with the shadow box. As best illustrated in FIG. 4 refractory walls 30 may be placed between the multiple ceramic slot reaction lines 10 to provide additional radiant refractives surfaces within the firebox, if desired.

Ceramic reactors allow cracking to make ethylene and other olefins at very short residence time and thus at unusually high temperature levels. As a consequence, the cracking furnace firebox temperature is several hundred degrees hotter than the 2000 to 2100° F. level which is the normal limit for reaction lines of a metallic construction. Rather than waste this additional heat, or use it in an inconsequential and extravagant way, it is a further important aspect of this invention to use this extra heat leaving the firebox as a flue gas to crack additional amounts of feedstock using a variation of a technique already patented by Stone & Webster called Duocracking (U.S. Pat. No. 4,765,883 dated Aug. 23, 1988). The components and furnaces illustrated by FIGS. 1–2 and 5–6 hereof are structures designed for this purpose In Duocracking the heat in the cracking effluent of one reactor is used to complete the cracking of a partially cracked effluent from another reactor. In applying Duocracking to the Slot Reactor system, as best illustrated in FIGS. 5–6, a Precracking firebox 40 is set immediately above the Slot Reactor firebox 50 to use its very high temperature flue gas. A set of medium or long residence time coils 42 in this Precracer firebox 40 are fed with a preheated steam diluted hydrocarbon feedstock prepared in the convection section 60 and this feed stock is cracked to a moderate severity, such as, in the case of ethane, to about 50% conversion in coils 42 of Precracker section 40. At this relatively low conversion, good selectivity of the feedstock conversion to ethylene is retained even though the residence time is not short.

The effluent of the Precracker is then led by transfer lines 46 to the slots 15 (FIGS. 3–4) located in the shadow boxes to be passed there-through to the lower end of the furnace housing below the firebox floor 19 (illustrated by arrows in FIG. 1) to meet the effluent of the very much hotter Slot Reactor effluent (illustrated by arrows in FIG. 1) where rapid mixing and further cracking of the Precracker effluent takes place to the 80% conversion level (in the case of ethane feedstock).

A further and important benefit of this Duocracking technique is the very rapid quenching of the Slot Reactor effluent by the heat sink of the Precracker effluent cracking. This rapid quenching is very advantageous in retaining ethylene selectivity in the high temperature Slot Reactor effluent. Furthermore, the cracking of the Precracker effluent is also very selective because of the rapid mixing and heat transfer with the hotter Slot Reactor effluent. The net result is that essentially the same amount of feedstock again as is fed to the Slot Reactor can be cracked selectively by this Duocracking or quench cracking means. This makes the overall process very efficient in its use of the high level heat required for the extremely short residence time of a ceramic reactor.

The Precracker and Duocracker parts of the crackling system design are depicted schematically in FIGS. 5 and 6.

The foregoing disclosure and description of the invention are illustrative and explanatory thereof, and various changes in the details of the illustrated apparatus and construction and method of operation may be made without departing from the spirit of the invention.

What is claimed is:

1. A furnace for cracking a saturated hydrocarbon feed stock into olefinic hydrocarbon products, comprising
   a fire box having a radiant heating volume within which is located a structure composed of a ceramic refractory material which, by opposing wall surfaces of the ceramic refractory material structure, defines a passage way for communication of a hydrocarbon mass through the radiant heating volume of said firebox, and
   a precracker section positioned to receive therein hot flue gases from the firebox, said precracker having reaction lines therein to receive an additional mass of saturated hydrocarbon feed stock for passage herethrough, and means outside the firebox for communicating an additional mass of hydrocarbon after passage through the precracker reaction lines into admixture with such hydrocarbon mass which has communicated through the passageway defined by the ceramic structure located in the firebox.

2. A furnace for cracking a saturated hydrocarbon feed stock into olefinic hydrocarbon products, comprising a furnace housing that defines a firebox and a shadow box appurtenant to the furnace housing on opposite sides of the firebox, said firebox having a radiant heating volume within which is located a pair of ceramic slabs that are spaced apart within the firebox by a pair of center ceramic spacers located at least in part within the firebox to define a firebox passageway which is located entirely within the firebox through which a hydrocarbon mass may be communicated and at each edge end by end spacers located within each shadow box appurtenant to the furnace housing which, in association with a center spacer, defines a shadow box passageway which is located entirely within the shadow box and a precracker section positioned to receive therein hot flue gases from the firebox, said precracker having reaction lines therein through which an additional mass of saturated hydrocarbon feed stock is optionally communicated into communication with the shadow box passageway for passage of the additional hydrocarbon mass into admixture with such hydrocarbon mass which has communicated through the firebox passageway.

\* \* \* \* \*